United States Patent [19]

Connolly et al.

[11] 4,027,384

[45] June 7, 1977

[54] MICROWAVE ABSORBERS

[75] Inventors: Thomas M. Connolly, Canton; Eino J. Luoma, Norwood, both of Mass.

[73] Assignee: The United States of America as represented by the Secretary of the Army, Washington, D.C.

[22] Filed: Nov. 19, 1976

[21] Appl. No.: 743,430

Related U.S. Application Data

[62] Division of Ser. No. 602,168, Aug. 5, 1975.

[52] U.S. Cl. .................................... 29/592; 29/600

[51] Int. Cl.[2] ........................................ H01S 4/00

[58] Field of Search ............ 29/592, 593, 600, 601; 343/18 A, 18 R; 333/95 R, 98 R, 98 M, 98 S, 99 R, 31 A, 70 R, 70 A, 73 N; 29/527.1; 427/105, 58

[56] References Cited

UNITED STATES PATENTS

| | | | |
|---|---|---|---|
| 3,680,107 | 7/1972 | Meinke et al. | 343/18 A |
| 3,721,982 | 3/1973 | Wesch | 343/18 A |
| 3,733,606 | 5/1973 | Johansson | 343/18 A |

OTHER PUBLICATIONS

"The Schornsteinfeger Project," Technical Report No. 90–45, 2/1960 Declassified, pp. 16–26.
"Nonreflecting Absorbers for Microwave Radiation," Electromagnetic Wave Theory Symposium, Hans Severin, 7/1956, pp.385–392.
"Principles of Microwave Circuits," C.G. Montgomery et al., M.I.T. RLS.

*Primary Examiner*—James R. Duzan
*Attorney, Agent, or Firm*—Nathan Edelberg; Norman L. Wilson, Jr.; Robert P. Gibson

[57] ABSTRACT

Microwave absorbers reduce radar cross-sections of airborne objects by attenuating reflectivity values. In Jaumann absorbers laminated layers are placed on the reflecting surfaces, the laminated layers being lossy layers separated by dielectric spacing layers. From the point of view of accuracy and reproducibility Jaumann absorbers have been difficult to construct. A mode of fabrication overcoming these difficulties is provided herein.

4 Claims, No Drawings

MICROWAVE ABSORBERS

BACKGROUND OF THE INVENTION

This invention, in one of its aspects, relates to microwave radiation absorbing materials, and particularly to electromagnetic wave absorbers known as Jaumann absorbers. The invention was made in the course of a contract with the Department of the Army.

This is a division of application Ser. No. 602,168, filed Aug. 5, 1975.

In another of its aspects the invention relates to means for fabricating Jaumann absorbers.

Technological advances in radar systems, in anti-missile systems and in surface-to-air anti-aircraft pose severe penetration problems for missiles, bombers, fighters and surveillance aircraft. To counteract such measures microwave absorbers must be used. Microwave absorbers reduce the radar cross-sections of such airborne objects by attenuating reflectivity values.

Electromagnetic wave absorbers of the general type contemplated herein are described in such patents as 2,875,435 and 2,822,539. Specifically, the Jaumann absorber is the subject of British T.R.E. Report No. T 1905. In these absorbers laminated layers are disposed on the face of the reflecting surface, the laminated layers being lossy layers separated by dielecctric spacing layers.

Cross-section reduction is accomplished through arrangement of the layers so that electromagnetic wave energy incident on the outer surface falls first upon an outer dielectric layer, the function of which is to create an extra null in the reflection level. The energy next proceeds through a partially conductive lossy layer and then through another dielectric layer. As many reflection reducing nulls exist as there are dielectric layers. The existence of the extra null makes the peaks lower.

As set forth in 2,822,539 this type of microwave radiation absorber is in the form of flat sheeting designed so as to provide a progressive decrease of the electrical index of refraction from the back surface to the front surface. It is stressed in that patent that difficulties such as the accuracy necessary for the construction of this type of absorber have limited its use. As another example of these difficulties, in the British T.R.E. Report describing the Jaumann absorber it is pointed out that the conductivity of the lossy layers was very difficult to control. In addition a special glue was necessary for sticking the layers together. Because of the critical nature of such absorber fabrication it has not been possible to produce an absorber of this type having a reflection loss greater than 30 decibels particularly a broad banded absorber with such a reflection loss.

SUMMARY OF THE INVENTION

In accordance with the practice of this invention a broad banded absorber having a reflection loss greater than 30 decibels is provided. The microwave absorber is of the type including a plurality of partially conductive lossy layers, whose conductivity increases from front layer to back layer. These lossy layers are separated by intermediate dielectric spacing layers. All of the layers are bonded together to form the Jaumann microwave absorber. This invention contemplates the combination of (a) spacing layers having a thickness equal to or less than one-fourth of the wavelength at the highest frequency, and a thickness such that the total thickness of the absorber is equal to or greater than one-half of the wavelength at the lowest frequency of the range to be absorbed, with (b) lossy layers fabricated with a homogeneity and isotropy such that average admittance values determined at a plurality of points in one degree of orientation do not differ from average values determined in another degree of orientation by more than ±0.02.

DETAILED DESCRIPTION OF THE INVENTION

In producing a Jaumann absorber the design parameters are the thickness and dielectric properties of the spacer layers, and the electrical properties of the lossy films. The utilization of these parameters to fabricate an absorber having a performance at least 30 decibels down from perfect reflection will now be described. Indeed a simple analytic optimization of the Jaumann design has heretofore not been possible.

From the production of previous absorbers it was known that desirable spacer layers were plastics, preferably foamed plastics, having dielectric constants of 1.02 to 1.30 and loss factors of 0.00005 to 0.0002. A preferred spacer layer is a closed-cell polyethylene foamed plastic having a dielectric constant of 1.03 and a loss factor of 0.0001. Nevertheless foams of polystyrene and polyvinylchloride, as are known, as well as polyurethane foams, are suitable.

As in the prior art the lossy layer depends for its performance on one of the forms of pulverulent carbon, such as ball milled carbon, powdered synthetic graphite or carbon black, the particle size being smaller than 350 Angstroms. The lossy layer can be a phenolformaldehyde or cellulose film by which the carbon particles are carried. However, it is preferred that one side of each spacer layer be coated with the carbon film to form a lossy film or semi-conductive layer on each sapcer layer. This eliminates the separate layer.

Utilizing these materials of the prior art, we now depart therefrom. Within their known ranges the dielectric constant and the loss tangent of the spacing layers are not critical. The imaginary part of the complex admittance also is not critical. This invention is based on the discovery that the spacing layer thickness, and the homogeneity and isotropy of the lossy layer, as well as the nominal admittance of the lossy film, are critical component properties of the abosrber.

Referring first to the film thickness, it has been stated generally that the absorber thickness is fixed to provide sufficient attenuation of the energy. While true, the statement is, of course, too general. In a six layer absorber, layers 0.140 inch thick were highly satisfactory whereas 0.12 inch and thinner layers resulted in poor performance. The spacer layers should have a thickness equal to or less than one-fourth of the wavelength of the highest frequency, such that the total thickness, of the absorber is equal to or greater than one-half of the wavelength of the lowest frequency of the range to be absorbed.

The key to the fabrication of a microwave absorber having a performance at least 30 decibels below complete reflection is the production of a homogeneous, isotropic lossy layer--the maintenance of a critical degree of carbon dispersion. Translated to admittance values of the various layers, on any layer, the average admittance values determined at a number of points in one direction do not vary from averages of a number of points in another direction by more than ±0.02. The number of measurements to be averaged in each degree of orientation should be representative of the surface. However as few as two in each direction will frequently suffice.

As is known, in a Jaumann absorber the admittance of the lossy film increases exponentially from layer to layer starting with the first lossy layer and progressing in the direction of travel of the incident wave. There is a gradual impedance change from maximum to minimum through the absorber and the theoretical performance of the absorber can be worked out from the chosen values. The object is to match the impedance of air at the front surface, and slowly taper this impedance to a very low value, approaching a short circuit, at the back surface. By this means reflections of incident energy are minimized while the increasing loss gradually attenuates the energy through conversion to heat. Normally admittance is graduated from values of 0.02 to 2.00, and, we have found that, starting from the back and proceeding toward the front successive values of admittance are approximately in the form of a geometric progression in which each successive value is about one-half of the preceding value. Thus when designing a Jaumann absorber it is possible to start with this series and optimize it by making small adjustments in individual admittance values, providing a rationale for analytical optimization.

It is important to have an understanding of the method used for measuring the admittance of the film after it has been applied to the surface of the foam. The measurements are made on a free-spaced interferometer. The frequency of the measurement is 8.6 GHz. It was found, however, that the setting of the frequency was not at all critical, and that the admittance of these lossy films changes only very slightly over a frequency range of from 7 to 15 GHz. Using the free-space interferometer, the insertion loss and insertion phase of a single sheet of spacer foam with the lossy film applied to one side is measured at 45° incidence and at perpendicular polarization. The theory for the conversion of these two measured parameters to complex admittance is known utilizing the following equations involving the real and imaginary parts (G and B respectively) of admittance equation $Y = G + jB$:

$G = 2/120\ \pi\ \sqrt{2}(10^{db/20} \cos A - 1)$ par
$B = 2/120\ \pi\ \sqrt{2}(10^{db/20} \sin A)$ par.
$B = 2/120\ \pi\ \sqrt{2}(10^{db/20} \cos A - 1)$ perp.
$B = 2/120\ \pi\ \sqrt{2}(10^{db/20} \sin A)$ perp.

In practice, this data reduction was programmed on a computer, making this phase of the admittance measurement very rapid.

Initially to determine admittances two foot squares of material were fabricated. A two-foot square can be conveniently divided into four one-foot squares, and it is possible to move the sheet in its own plane to permit determination of the admittance at the center of each one-foot square. It is also possible to rotate the sheet in its own plane 90°, thus making admittance measurements possible in different orientations. This technique was used to evaluate the isotropy and homogeneity of the lossy film, the test being that on any one layer, average admittance values determined over the surface in any one direction do not differ more than ±0.02 from average admittance values determined over the surface in any other direction.

Having characterized the essential features of the microwave absorber of the invention, its fabrication will now be considered. This fabrication can be best explained by describing a preferred embodiment of the invention. This preferred absorption device is in the form of six dielectric foam layers and six semiconductive, lossy layers. The dielectric or spacer layers are cut from sheets of closed-cell foamed polyethylene having a dielectric constant of 1.02 and a loss tangent of 0.0001. The thickness of each layer, found to be critical as previously indicated, is 0.140 inch. The size of the sheet depends, of course, upon the area whose radar cross-section is being reduced. Preferably four foot square sections are fabricated and then secured to the surface of the interferring object.

Rather than utilizing a separate lossy layer on paper or cellulose, each low loss spacer layer is coated on its front side with a lossy film. As previously discussed the electrical properties of a lossy film are defined in terms of a complex normalized admittance. Measurements on typical lossy films demonstrated that the imaginary part of the complex admittance was so small it can be ignored. Measurements at different frequencies demonstrated that the admittance values of the film did not change significantly with frequency.

The lossy layer depends on pulverulent carbon as the medium which affords the semi-conductivity, a binder being employed to provide a permanent layer, the coating composition being a suspension of a sufficient quantity of carbon particles to render the film semiconductive. Either aqueous or hydrocarbon binder systems can be used, aqueous systems containing about twenty-five weight percent carbon being preferred. Water dilution is important and flexibility of the coat will also be a consideration. A preferred binder is an aqueous emulsion of polyvinyl acetate. However cellulosics, acrylics and polyvinyl alcohol emulsions can also be employed. As indicated hereinbefore the isotropy and homogeneity of the lossy layer are vital, these desiderata being monitored by admittance value measurements. It will be shown, for instance, that the critical degree of carbon dispersion and distribution cannot be obtained by brushing or spraying the films onto the foam layer. Such films do not possess the required isotropy, and they do not meet requirements for homogeneity. If the admittance values, on the average, vary more than ±0.02, microwave attenuation of the absorber diminishes. Rolled on films can be uniformly applied, particularly by printing equipment. However such films also lack the required isotropy. Moreover, since film thickness increases from the front of the microwave absorber to the back, it is necessary to apply several coats with drying after each coat. This procedure heightens the film application problem. We have obtained the requisite isotropy and homogeneity by silk screen printing. The difference between methods of application is best illustrated by a comparison of admittance values made on two-foot squares of material. Each two-foot square is divided into four one-foot squares, A, B, C, & D whose surfaces are measured by interferometer. The following is a comparison of a silk screen printed lossy layer with an expertly applied spray coat.

| CORNER | ORIENTATION SPRAY COAT | | ORIENTATION SILKED SCREENED COAT | |
|---|---|---|---|---|
| | 0° | 90° | 0° | 90° |
| A | 0.72 | 0.67 | 0.64 | 0.63 |
| B | 0.67 | 0.64 | 0.61 | 0.59 |
| C | 0.59 | 0.60 | 0.63 | 0.66 |
| D | 0.68 | 0.56 | 0.63 | 0.64 |

-continued

| CORNER | ORIENTATION SPRAY COAT | | ORIENTATION SILKED SCREENED COAT | |
|---|---|---|---|---|
| AVERAGE | 0.67 | 0.62 | 0.63 | 0.63 |

It can be seen from the foregoing that the average of the admittance values taken over the surface in one degree of orientation in the case of the spray coat differs by 0.05 from the average of the admittance values taken over the surface in the other degree of orientation. In the silk screened coat these average values are the same. Electrophoretic and electrodeposition methods also lend themselves to the invention.

Having attained the desired degree of lossy layer homogeneity and isotropy it is important not to destroy it during fabrication. It was found, for instance, that the application of liquid bonding materials, wet adhesives, to the lossy layer changed the admittance values of the films. The following example illustrates the seriousness of this problem. The admittance values of three sheets having different admittance levels were first obtained: The three sheets were then sprayed with the adhesive and allowed to dry overnight. The following data show the change produced by the application of the adhesive:

| SHEET NO. | ADMITTANCE, G BEFORE ADHESIVE | AFTER ADHESIVE |
|---|---|---|
| 1 | 0.15 | 0.17 |
| 2 | 0.58 | 0.94 |
| 3 | 0.52 | 2.00 |

This data appears to indicate not only a disorientation of carbon particles but an increase in electrical contact between particles. It was evident from the data that an improved technique for bonding the layers was needed. It is interesting to note that the change produced by the application of the adhesive becomes greater as the admittance increases.

It was found that this bonding problem could be overcome by the use of a dry adhesive. Double-sided pressure sensitive adhesive was found to have excellent adhesion to both the spacer foam and the lossy film. Moreover the effect on the admittance of the lossy film was found to be insignificant. The pressure sensitive adhesive also adheres well to metal surfaces. Hence the absorber can readily be bonded to metal surfaces for microwave cross-section reduction.

It can be seen that in accordance with the practice of this invention an improved absorber of the Jaumann type is provided. Performances of these absorbers are approximately 10db better than standard absorbers.

As an example consider the performance of a six layer absorber having 0.140 inch spacing layers -dielectric constant 1.03- to which lossy films were applied by silk screen printing. The lossy films had the following admittance values:

| LOCATION OF FILM | G, REAL PART OF ADMITTANCE |
|---|---|
| Black | 1.6 |
| 2 | 0.8 |
| 3 | 0.4 |
| 4 | 0.25 |
| 5 | 0.15 |
| Front | 0.04 |

When the layers were bonded together, using a dry adhesive as described, the performance of the resulting Jaumann absorber was:

| FREQUENCY, GHz | DB DOWN FROM 100% REFLECTIVITY |
|---|---|
| 7 | 28 |
| 8 | 27 |
| 9 | 30 |
| 10 | 32 |
| 11 | 31 |
| 12 | 30 |
| 13 | 30 |
| 14 | 32 |
| 15 | 31 |
| Average | 30 |

It is clear that a Jaumann microwave absorber affording outstanding protection is fabricated in accordance with this invention. The absorber is the result of fabrication techniques not heretofore employed. Given the teachings of the invention, modifications and variations will occur to those skilled in the art. Thus greater or fewer layers, and related admittance values can be used depending upon the desired attenuation, the key being the uniformity and isotropy of the lossy layer. In order to provide better adhesion between the lossy layer and the foam spacer, the spacer foam can be sized prior to tape application with a suitable bonding agent, such as one of the solvent-based adhesives having good adhesion to rubber and plastic materials. A particularly desirable modification involves the use of a protective layer on the outside of the absorber. To confer on the absorber an environmental capability a foamed plastic cover with a higher density than the spacer foam is provided as a cover layer. This protective layer, is, in effect, a thin walled, low-dielectric-constant radome. These and other ramifications are deemed to be within the scope of this invention.

What is claimed is:

1. A process for fabricating a Jaumann microwave absorber of the type including a plurality of partially conductive lossy layers, separated by intermediate dielectric spacing layers all bonded together to form the absorber, which comprises, to form the lossy layers, applying to a base a film forming emulsion of pulverulent carbon, orienting and placing the pulverulent carbon on application to form a film having a homogeneity and isotropy such that average admittance values determined at a plurality of points in one degree of orientation do not differ from average values determined in another degree of orientation by more than ±0.02, bonding the lossy layer to an adjacent spacing layer having a dielectric constant of 1.03 and a loss tangent of 0.0001 by bonding means not disruptive to the pulverulent carbon conductance, orientation and film homogeneity, and maintaining a spacing layer thickness not greater than one-fourth of the wavelength at the highest frequency, such that the total thickness of the absorber is at least one-half of the wavelength at the lowest frequency of the range to be absorbed.

2. The process of claim 1 wherein a lossy layer is applied to the top of a spacing layer as the base.

3. The process of claim 2 wherein the orientation and placing to form the isotropic, homogeneous film is effected by silk screening.

4. The process of claim 2 wherein the bonding means entails a dry adhesive.

* * * * *